(12) United States Patent
Kohlberger

(10) Patent No.: US 9,799,873 B2
(45) Date of Patent: Oct. 24, 2017

(54) BATTERY ASSEMBLY OF A BATTERY HAVING TWO DIFFERENT CELL TYPES

(71) Applicants: Robert Bosch GmbH, Stuttgart (DE); Samsung SDI Co., Ltd., Yongin-si, Gyeonggi-do (KR)

(72) Inventor: Markus Kohlberger, Stuttgart (DE)

(73) Assignees: Robert Bosch GmbH, Stuttgart (DE); Samsung SDI Co., Ltd, Yongin-si, Gyeonggi-do (KR)

( * ) Notice: Subject to any disclaimer, the term of this patent is extended or adjusted under 35 U.S.C. 154(b) by 306 days.

(21) Appl. No.: 14/273,738

(22) Filed: May 9, 2014

(65) Prior Publication Data
US 2014/0342216 A1 Nov. 20, 2014

(30) Foreign Application Priority Data
May 16, 2013 (DE) .................. 10 2013 209 069

(51) Int. Cl.
*H01M 2/20* (2006.01)
*H01M 2/00* (2006.01)
*H01M 16/00* (2006.01)
*B60L 11/18* (2006.01)

(52) U.S. Cl.
CPC ......... *H01M 2/206* (2013.01); *B60L 11/1864* (2013.01); *B60L 11/1879* (2013.01); *H01M 16/00* (2013.01); *Y02T 10/7011* (2013.01); *Y02T 10/7061* (2013.01)

(58) Field of Classification Search
CPC ........ H01M 2/20; H01M 2/206; H01M 16/00; B60L 11/005; B60L 11/1874; B60L 11/1864; B60L 11/1879
See application file for complete search history.

(56) References Cited

U.S. PATENT DOCUMENTS

| 5,993,983 | A | * | 11/1999 | Rozon | ................. | H01M 6/5033 |
| | | | | | | 429/156 |
| 6,037,756 | A | * | 3/2000 | Pong | ..................... | H01M 16/00 |
| | | | | | | 320/118 |
| 2009/0159582 | A1 | | 6/2009 | Chami et al. | | |

(Continued)

FOREIGN PATENT DOCUMENTS

| CA | 2 428 403 A1 | 11/2004 |
| DE | 198 46 319 C1 | 2/2000 |
| DE | 101 93 714 T1 | 10/2003 |

(Continued)

OTHER PUBLICATIONS

Machine Translation of: DE 102009035475, Friebe et al., Feb. 3, 2011.*

(Continued)

*Primary Examiner* — Kenneth Douyette
(74) *Attorney, Agent, or Firm* — Maginot, Moore & Beck LLP

(57) ABSTRACT

A battery assembly includes at least one first cell unit of a first cell type and a first connection which is connected to a pole of the at least one first cell unit. The battery assembly also includes at least one second cell unit of a second cell type. The at least one second cell unit is different from the at least one first cell unit. The battery assembly also includes a second connection which is connected to a pole of the at least one second cell unit.

9 Claims, 1 Drawing Sheet

(56) References Cited

U.S. PATENT DOCUMENTS

2010/0087961 A1     4/2010  Velez
2010/0207577 A1*    8/2010  Sugiyama ............ H01M 10/44
                                                    320/118

FOREIGN PATENT DOCUMENTS

| DE | 10 2007 052 750 A1 | 5/2009 |
| DE | 10 2009 031 295 A1 | 1/2011 |
| DE | 10 2009 035 475 A1 | 2/2011 |
| DE | 10 2010 024 235 A1 | 12/2011 |
| JP | 09180768 A * | 7/1997 |
| WO | 2008/121982 A1 | 10/2008 |

OTHER PUBLICATIONS

Machine Translation of: JP 09-180768A. Npgami et al., Jul. 11, 1997.*

* cited by examiner

BATTERY ASSEMBLY OF A BATTERY HAVING TWO DIFFERENT CELL TYPES

This application claims priority under 35 U.S.C. §119 to patent application number DE 10 2013 209 069.2, filed on May 16, 2013 in Germany, the disclosure of which is incorporated herein by reference in its entirety.

BACKGROUND

The present disclosure relates to a battery assembly which has at least one first cell unit of a first cell type and at least one second cell unit of a second cell type, which second cell unit is different from the first cell unit.

Electrical energy stores are used in hybrid, plug-in hybrid and electric vehicles in order to store the energy required for operating the electric motor of the electric vehicle, which electric motor at least partially assists driving of said electric vehicle. So-called lithium-ion batteries are used for this purpose in latest-generation vehicles. The electric vehicle iMiev which comprises lithium-ion batteries of this kind was introduced to the German market in 2011.

Lithium-ion battery cells and lithium-ion batteries are distinguished, amongst other things, by a high energy density and an extremely low level of self-discharging. Said lithium-ion battery cells have at least a positive and a negative electrode, said electrodes also being called cathode and, respectively, anode and being able to reversibly insert lithium ions (Li+) during so-called intercalation or extract said lithium ions again during so-called deintercalation. Drive batteries in hybrid, plug-in hybrid and electric vehicles are usually of modular configuration. In this case, battery modules are formed from at least two battery cells which are interconnected in series or in parallel, said battery modules in turn being combined to form relatively large subunits which can share, for example, a common cooling device. Two or more subunits of this kind can then be interconnected to form a battery, wherein the subunits can also be arranged in several levels one above the other depending on the installation space available.

In practice, high-energy cells are sometimes combined with double-layer capacitors in one energy store, said double-layer capacitors being arranged in two different, separate assemblies. In this case, the double-layer capacitors function as high-power cells which are able to briefly provide high powers. If the combination of high-power cells and high-energy cells is installed, for example, in an electric vehicle, the high-power cells serve, for example in the event of an acceleration operation of the electric vehicle, to provide the high power which is required for said acceleration operation, while the high-energy cells serve to store the energy which is required for traveling over a predetermined range of the electric vehicle. However, the interconnection of high-energy cells and high-power cells within the energy store is relatively complex, in particular since cell units comprising two different assemblies have to be linked to one another.

SUMMARY

The disclosure provides a battery assembly which comprises at least one first cell unit of a first cell type and also a first connection which is connected to a pole of the first cell unit. According to the disclosure, the battery assembly has at least one second cell unit of a second cell type, which second cell unit is different from the first cell unit and also has a second connection which is connected to a pole of the second cell unit.

The advantage of a battery assembly which is configured in this way is that said battery assembly can have two different cell units, that is to say, for example, both high-power cells and also high-energy cells, which therefore can be used in one and the same battery assembly. Owing to the combined use of two different cell types, it is not necessary, for example in an electrically operated motor vehicle, to install two battery assemblies into which the two different cell units are each installed on their own, that is to say separately from one another. As a result, costs and installation space can be saved. Furthermore, different tasks can be performed by the different cell units. In this case, a cell unit can be any type of energy store or energy supply means, for example can be an electrode assembly, a battery cell, a battery module, a battery subunit which is made up of several battery modules, or else a battery itself. In this context, the term "cell type" is directed at the value of the energy density and, respectively, at the value of the power density of a cell unit under consideration, or to the ratio of these variables in relation to one another, that is to say to the ratio of energy density to power density of the respective cell unit. Therefore, if cell units differ from one another in respect of their respective ratio of energy density to power density, said cell units belong to different cell types according to the above definition. A different ratio of energy density to power density between two cell units can be achieved by a different chemical or physical structure of the cell units or a different configuration within the cell units. For example, the electrode ensemble of a first cell unit of a first cell type can differ from a second cell unit of a second cell type, for example, in respect of the coating thickness of the electrodes, the compaction, the ratio of active material to binder, the type of conductive material used and/or the type of active material used.

The first cell unit of the first cell type is preferably a high-energy cell unit and/or the second cell unit of the second cell type is advantageously a high-power cell unit. In other words, the first cell unit is preferably a so-called high-energy cell, also called he-cell, while the second cell unit is preferably a so-called high-power cell, also called hp-cell.

High-power cell units are smaller than high-energy cell units and have a higher power density than high-energy cell units. To this end, the energy density of the high-power cell units is lower than that of the high-energy cell units. If the battery assembly is used, for example, in the energy store of the drive train of an electrically operated motor vehicle, the battery assembly is better matched to the changing acceleration operations of the electrically operated motor vehicle by virtue of the installation of a high-energy cell unit and also a high-power cell unit. In the event of high acceleration levels, a high power can be provided by the high-power cell unit for a short period of time, while the high-energy cell unit is able to provide energy over a relatively long period of time in which, for example, only relatively small fluctuations in acceleration occur.

In a preferred embodiment, the battery assembly has a large number of identical first cell units and a large number of identical second cell units. In other words, the battery assembly preferably has a large number of high-energy cell units and a large number of high-power cell units. In an embodiment of this kind, the amount of voltage or current which can be provided by the battery assembly can be increased depending on the number of high-energy cell units and high-power cell units, and can be matched to the respectively existing requirements.

Preferably, in each case alternately, a first cell unit follows a second cell unit, and a second cell unit follows a first cell unit. In an embodiment of this kind, the installation space within the battery assembly is utilized effectively. If the first cell units are configured as high-energy cell units or as high-energy cells, and the second cell units are configured as high-power cell units or as high-power cells, in an arrangement of the first and second cell units as described above, the high-energy cell units or the high-energy cells serve as thermal buffers for the high-power cell units or the high-power cells.

The positive or the negative poles of the first cell units are preferably each connected to the first connection and/or the positive or the negative poles of the second cell units are each connected to the second connection. Further preferably, the first cell units within the battery assembly are connected to one another in parallel and/or the second cell units within the battery assembly are connected to one another in parallel. As a result, the first and the second cell units can be subjected to loading separately from one another. If the first cell units are configured, for example, as high-energy cells, and the second cell units are configured, for example, as high-power cells, and the battery assembly is installed within an electrically operated motor vehicle, the current for driving the electrically operated motor vehicle can be drawn, for example, from the high-power cells during an acceleration operation, whereas said current can be drawn from the high-energy cells when traveling at a constant speed. Owing to the parallel circuits, the current which can be provided by the respective cell units or battery cells is greatly increased.

In a preferred further development of one of these embodiments, the first cell units are connected in series and/or the second cell units are connected in series. Owing to a series connection of the first cell units to one another and a separate series connection of the second cell units to one another within the battery assembly, the voltage which can be provided by these series circuits is greatly increased.

The battery assembly is preferably a battery module, and the first cell unit is preferably a high-energy battery cell, wherein the second cell unit is a high-power battery cell. High-energy and high-power battery cells can be distinguished from one another, for example, in respect of the type of coating and the manner of combination of the active materials of the electrode ensembles which are installed in the battery cells. Whereas high-power battery cells with installation volumes which are generally relatively low in comparison to high-energy battery cells have a higher power density than high-energy battery cells, high-energy battery cells have a higher energy density than high-power battery cells. Therefore, high-energy battery cells can store a larger amount of energy than high-power battery cells, while high-power battery cells can provide a higher current than high-energy battery cells, at least for a short time. Owing to the installation of high-energy and high-power battery cells, the power and, respectively, energy which can be provided by the battery module is better matched to the requirement profile of a motor vehicle. Specifically, high-power and high-energy battery cells differ, as already mentioned, in respect of the electrode ensembles which are installed in said battery cells. The electrode ensembles which are installed in a high-power battery cell can have a different coating thickness, a different compaction, a different ratio of active material to binder, a different conductive material and/or a different active material than a high-energy battery cell.

The battery assembly is preferably a battery cell, and the first cell unit is preferably a first electrode ensemble which has the properties of a high-energy cell, and the second cell unit is a second electrode ensemble which has the properties of a high-power cell. In other words, the first cell unit is preferably a high-energy electrode ensemble, and the second cell unit is preferably a high-power electrode ensemble. In this case, high-energy electrode ensembles have a higher energy density than high-power electrode ensembles, while high-power electrode ensembles have a higher power density than high-energy electrode ensembles. In this case, high-energy electrode ensembles and high-power electrode ensembles can differ from one another in respect of the coating thickness, the compaction, the ratio of active material to binder, the type of conductive material used and/or the type of active material used.

The power density of the second cell unit preferably corresponds to at least 2 times the power density of the first cell unit. The power density of the second cell unit further preferably corresponds to 2 times to 7.5 times the power density of the first cell unit. With a second cell unit of this kind, the battery assembly is particularly well-suited to being installed in an electrically operated motor vehicle since high currents, that is to say a high power, are/is required for a short period of time during an acceleration operation of said motor vehicle.

The energy density of the first cell unit further preferably corresponds to 3 times to 10 times the energy density of the second cell unit. With a first cell unit of this kind, the battery assembly is particularly well-suited to being installed in an electrically operated motor vehicle since it has to be possible to store a large amount of energy for traveling over a long distance.

Both the first cell unit and also the second cell unit are further preferably configured as lithium-ion cell units. Lithium-ion cell units generally have a high energy density and a high level of thermal stability.

A battery comprising a battery assembly according to the disclosure is also provided, wherein the battery is particularly preferably configured as a lithium-ion battery. The advantages of batteries of this kind include their comparatively high energy density and their high level of thermal stability. A further advantage of lithium-ion batteries is that they are not subject to a memory effect.

A motor vehicle comprising a battery comprising a battery assembly according to the disclosure is also provided, wherein the battery is connected to a drive system of the motor vehicle.

Further developments of the disclosure are specified and described in the description.

BRIEF DESCRIPTION OF THE DRAWINGS

Exemplary embodiments of the disclosure will be explained in greater detail below with reference to the drawings and the following description. In the drawings.

DETAILED DESCRIPTION

Figure 1:
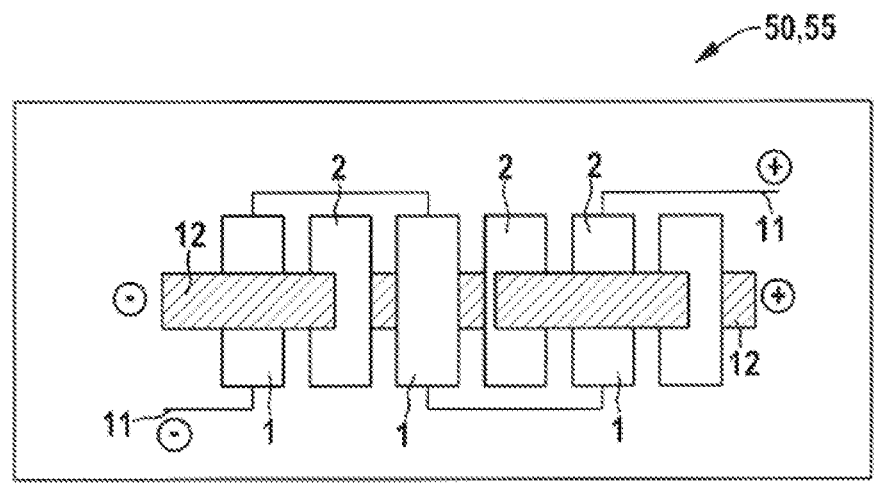
FIG. 1 shows a schematic exemplary embodiment of a battery assembly according to the disclosure which is configured as a battery module.

FIG. 1 shows a schematic exemplary embodiment of a battery assembly 50 according to the disclosure which is configured as a battery module 55. In this exemplary embodiment, the battery assembly 50 according to the disclosure comprises, purely by way of example, a large number of first cell units 1, which are identical to one another, of a first cell type, and a large number of second cell units 2, which are identical to one another, of a second cell type, which second cell units differ from the first cell units 1 of the first cell type. Only in each case three of the first and second cell units 1, 2 are schematically illustrated in FIG. 1. The actual number of first and second cell units 1, 2 which are installed in the battery module 55 is substantially higher. In this exemplary embodiment, the first and second cell units 1, 2 are each arranged, purely by way of example, alternately next to one another, so that in each case a first cell unit 1 follows a second cell unit 2, and a second cell unit 2 follows a first cell unit 1. However, it is also possible to form other battery assemblies 50 according to the disclosure in which first and second cell units 1, 2 are arranged within a battery module 55 in a different way. Furthermore, it is likewise possible to form battery assemblies 50 according to the disclosure which have only a single first cell unit 1 of a first cell type and only a single second cell unit 2 of a second cell type. In this exemplary embodiment, the first cell units 1 are connected to one another in series, purely by way of example, within the battery module 55. In other words, in this exemplary embodiment, the negative pole of the first cell unit 1 which is arranged in a second position from the right is electrically conductively connected, purely by way of example, to the positive pole of the first cell unit 1 which is arranged in the fourth position from the right, owing to the alternating arrangement of first and second cell units 1, 2. The negative pole of the first cell unit 1 which is arranged in the fourth position from the right is further electrically conductively connected, purely by way of example, to the positive pole of the first cell unit 1 which is arranged in the sixth position as viewed from the right. In this exemplary embodiment, the positive pole of the first cell unit 1 which is arranged in the second position from the right is electrically conductively connected, purely by way of example, to a first connection 11, while the negative pole of the first cell unit 1 which is arranged in the sixth position as viewed from the right is electrically conductively connected to a second first connection 11.

In this exemplary embodiment, the second cell units 2 are connected to one another in series, purely by way of example, within the battery module 55. In other words, in this exemplary embodiment, the negative pole of the second cell unit 2 which is arranged in the first position from the right is electrically conductively connected, purely by way of example, to the positive pole of the second cell unit 2 which is arranged in the third position from the right, owing to the alternating arrangement of first and second cell units 1, 2. The negative pole of the second cell unit 2 which is arranged in the third position from the right is further electrically conductively connected, purely by way of example, to the positive pole of the second cell unit 2 which is arranged in the fifth position as viewed from the right. In this exemplary embodiment, the positive pole of the second cell unit 2 which is arranged in the first position from the right is electrically conductively connected, purely by way of example, to a first second connection 12, while the negative pole of the second cell unit 2 which is arranged in the fifth position as viewed from the right is electrically conductively connected to a second connection 12. In other words, the battery assembly 50 according to the disclosure has, in this exemplary embodiment, purely by way of example, four connections 11, 12, two first connections 11 and two second connections 12, wherein in each case one of the first and in each case one of the second connections 11, 12 is positive, while the respectively remaining connections 11, 12 are negative. However, battery assemblies 50 according to the disclosure can also be provided with only two, only three or else more than four connections 11, 12, it being possible for the first and/or the second cell units 1, 2 to be interconnected differently, for example in parallel to one another.

In this exemplary embodiment, the first cell units 1 are, purely by way of example, high-energy cell units, while the second cell units 2 are, purely by way of example, high-power cell units. More precisely, the first cell units 1 are high-energy battery cells, and the second cell units 2 are high-power battery cells. In this exemplary embodiment, both the high-energy battery cells and also the high-power battery cells are, purely by way of example, lithium-ion battery cells. In this exemplary embodiment, the high-power battery cells have, purely by way of example, a capacitance of 5 to 6 Ah and the high-power battery cells are configured to provide a current of 200 A. In this exemplary embodiment, the high-energy battery cells each have, purely by way of example, 3 times the energy density of one of the installed high-power battery cells. In this exemplary embodiment, the capacitance of the high-energy battery cells is, purely by way of example, approximately 15 to 18 Ah. Furthermore, the high-energy battery cells each have, purely by way of example, only half the power density of one of the installed high-power battery cells. In this exemplary embodiment, the high-energy battery cells can each provide, purely by way of example, only a current of 100 A. However, battery assemblies 50 according to the disclosure can also be realized in which the first and second cell units 1, 2 have energy density ratios in relation to one another which differ from those mentioned above or power density ratios which differ from those mentioned above. For example, the energy density of the high-energy battery cells can be 10 times higher than the energy density of the high-power battery cells. Secondly, the power density of the high-power battery cells can, for example, also be lower than or greater than two times as high as the power density of the high-energy battery cells.

In this exemplary embodiment, high-energy and high-power battery cells differ from one another, purely by way of example, in respect of the configuration of the active materials which are installed or used in the high-energy and high-power battery cells. More precisely, the high-energy and high-power battery cells differ from one another in respect of the configuration of the anode and cathode masses of the electrode ensembles which are installed in the respective battery cells.

Figure 2:
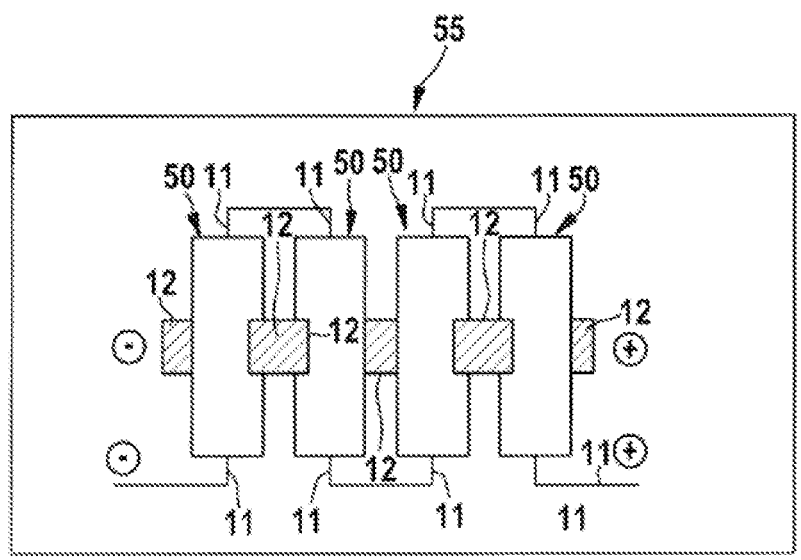
FIG. 2 shows a schematic exemplary embodiment of a battery module comprising a plurality of battery assemblies which are configured according to the disclosure as battery cells.

FIG. 2 shows a schematic exemplary embodiment of a battery module 55 comprising a plurality of battery assemblies 50 which are configured according to the disclosure as battery cells. In other words, FIG. 2 shows a battery module 55 in which a large number of battery assemblies 50 according to the disclosure are installed, said battery assemblies being configured as battery cells. Each of these battery assemblies 50, which are configured as battery cells, comprises at least two electrode ensembles or two electrode assemblies, one of which is or constitutes a first cell unit 1, and another of which is or constitutes a second cell unit 2 which is different from the first cell unit 1. The first cell unit 1 therefore is of a first cell type, while the second cell unit 2 is of a second cell type which is different from the first cell type. In this exemplary embodiment, the first cell unit 1 is, purely by way of example, a high-energy electrode ensemble, that is to say an electrode ensemble which has the properties of a high-energy cell owing to its energy density and its power density. In this exemplary embodiment, the second cell unit 2 is, purely by way of example, a high-power electrode ensemble, that is to say an electrode ensemble which has the properties of a high-power cell owing to its energy density and its power density. In this exemplary embodiment, the energy density of the high-energy electrode ensemble is, purely by way of example, 4 times as high as the energy density of the high-power electrode ensemble. However, the power density of the high-power electrode ensemble is, purely by way of example, 3 times as high as the power density of the high-energy electrode ensemble in this exemplary embodiment.

In this exemplary embodiment, each of the battery cells has, purely by way of example, in each case two first electrically conductive connections 11 and two second electrically conductive connections 12. Within the battery cells, in each case a first connection 11 is electrically conductively connected to the positive pole of the respective high-energy electrode ensemble, while the remaining first connection 11 is electrically conductively connected to the negative pole of the respective high-energy electrode ensemble. Furthermore, within the battery cells, in each case a second connection 12 is electrically conductively connected to the positive pole of the respective high-power electrode ensemble, while the remaining second connection 12 is electrically conductively connected to the negative pole of the respective high-power electrode ensemble. In other words, for each battery cell, the first connections 11 are electrically conductively connected to in each case one of the poles of the respective high-energy electrode ensemble, while, for each battery cell, the second connections 12 are electrically conductively connected to in each case one of the poles of the respective high-power electrode ensemble.

Within the battery module 55, the first connections 11 of the battery cells are each connected to one another such that the high-energy electrode ensembles of all of the battery cells are connected to one another in series. Separately therefrom, the second connections 12 of the battery cells are each electrically conductively connected to one another such that the high-power electrode ensembles of all of the battery cells are connected to one another in series. In other words, the first connection 11, which is connected to the negative pole of the high-energy electrode ensemble, of the first battery cell as viewed from the right is, for example, electrically conductively connected to the first connection 11, which is connected to the positive pole of the high-energy electrode ensemble, of the second battery cell as viewed from the right. In this way, in each case a first connection 11 of an n-th battery cell is electrically conductively connected to the (n+1)-th first connection 11 of a further battery cell which is adjacent to the n-th battery cell, wherein in each case the polarity of the first connection 11 of the n-th battery cell differs from the polarity of the first connection 11 of the (n+1)-th battery cell, which first connection of the (n+1)-th battery cell is connected to said first connection of the n-th battery cell. Furthermore, the first connection 11, which is connected to the positive pole of the high-energy electrode ensemble, of the first battery cell as viewed from the right can be connected, purely by way of example, to a load. Similarly, the first connection 11, which is connected to the negative pole of the high-energy electrode ensemble, of the fourth battery cell as viewed from the right can be connected to a load. Analogously to this connection of the first connections 11 to one another and in each case within the battery cells to the poles of the high-energy electrode ensembles, the high-power electrode ensembles having the in each case two second connections 12 of the battery cells and having the second connections 12 of all battery cells are interconnected. Therefore, the second connection 12 which is connected to the negative pole of the high-power electrode ensemble of the first battery cell as viewed from the right is connected to the second connection 12 of the second battery cell as viewed from the right, said second connection, for its part, being electrically conductively electrically conductively connected to the positive pole of the high-power electrode ensemble of the second battery cell. The second connection 12 to the positive pole of the high-power electrode ensemble of the first battery cell as viewed from the right can be connected to a load. Furthermore, the second connection 12 to the negative pole of the high-power electrode ensemble of the fourth battery cell as viewed from the right can be connected to a load. To improve understanding, the polarities of the first and second connections 11, 12 which can be respectively connected to a load are indicated both in FIG. 1 and in FIG. 2.

If the battery module 55 having the battery assemblies 50 which are configured as battery cells is connected to a load, said load can therefore draw energy from the high-energy electrode ensembles and/or from the high-power electrode ensembles of the battery module 55 depending on the requirement profile. In this exemplary embodiment, the high-energy electrode ensembles and the high-power electrode ensembles differ, purely by way of example, in respect of the chemical or physical configuration of the active materials which are installed or used for realizing the respective electrode ensembles.

However, battery assemblies 50 according to the disclosure other than those described above can be formed. For example, battery assemblies 50 according to the disclosure which function as starter batteries can be realized, said battery assemblies having, for example, three first cell units 1 which are connected in series and are configured as high-energy cells and have a capacitance of in each case 40 Ah, and said battery assemblies having, for example, three second cell units 2 which are connected in series and are configured as high-power cells and have a capacitance of in each case 5.9 Ah. If a battery assembly 50 of this kind is installed, for example, in a battery-operated motor vehicle, the high-power cells can provide a high current when there is a high current requirement, such as in the case of cold-starting for example. In connection to this, the high-power cells which are partially or completely discharged are then supported by the high-energy cells and recharged, in order to be able to allow a further starting process of the motor vehicle even shortly thereafter. In contrast to this, current for side lights is drawn, for example, from the high-energy cells. Therefore, cold-starting is still possible by means of the high-power cells even when the high-energy cells are completely empty.

What is claimed is:
1. A battery assembly, comprising:
a plurality of first cell units of a first cell type;
a first connection connected to a positive pole of at least one of the plurality of first cell units;
a second connection connected to a negative pole of at least one of the plurality of first cell units;
a plurality of second cell units of a second cell type, the second cell type different from the first cell type;
a third connection connected to a positive pole of at least one of the plurality of second cell units; and
a fourth connection connected to a negative pole of at least one of the plurality of second cell units, wherein the battery assembly is a battery cell,
the plurality of first cell units of the first cell type are each high-energy cell units with a respective first electrode ensemble,
the plurality of second cell units of the second cell type are each high-power cell units with a respective second electrode ensemble,
each of the respective first electrode ensembles have a higher energy density than each of the respective second electrode ensembles,
each of the respective second electrode ensembles have a higher power density than each of the respective first electrode ensembles, and
at least one of (i) the first cell units in the first plurality of unit cells are connected in series, and (ii) the second cell units in the second plurality of unit cells are connected in series.

2. The battery assembly according to claim 1, wherein, the first cell units in the plurality of first cell units are interleaved with the second cell units of the plurality of second cell units.

3. The battery assembly according to claim 1, wherein the first cell units in the plurality of first cell units are connected in series, and the second cell units in the plurality of second cell units are connected in series.

4. The battery assembly according to claim 1, wherein a power density of a first cell unit of the plurality of second cell units corresponds to at least 2 times a power density of a second cell unit of the plurality of first cell units.

5. The battery assembly according to claim 1, wherein an energy density of a first cell unit of the plurality of first cell units corresponds to at least 3 times an energy density of a second cell unit of the plurality of second cell units.

6. A battery, comprising:
a battery group, including:
a plurality of first cell units of a first cell type;
a first connection connected to a positive pole of at least one first cell unit of the plurality of first cells;
a plurality of second cell units of a second cell type, the second cell type different from the first cell type; and
a second connection connected to a positive pole of at least one second cell unit of the plurality of second cell units, wherein
the battery group is a battery cell,
the plurality of first cell units of the first cell type are each high-energy cell units with a respective first electrode ensemble,
the plurality of second cell units of the second cell type are each high-power cell units with a respective second electrode ensemble,
each of the respective first electrode ensembles have a higher energy density than each of the respective second electrode ensembles,
each of the respective second electrode ensembles have a higher power density than each of the respective first electrode ensembles, and
at least one of (i) the first plurality of unit cells, (ii) the second plurality of unit cells are connected in series.

7. The battery according to claim 6, wherein, the first cell units in the plurality of first cell units are interleaved with the second cell units of the plurality of second cell units.

8. A motor vehicle, comprising:
a drive system; and
a battery having a battery group, the battery group including:
a plurality of first cell units of a first cell type;
a first connection connected to a positive pole of at least one of the plurality of first cell units;
a plurality of second cell units of a second cell type, the second cell type different from the first cell type; and
a second connection connected to a positive pole of at least one of the plurality of second cell units, wherein
the battery is connected to the drive system of the motor vehicle,
the battery group is a battery cell,
the plurality of first cell units of the first cell type are each high-energy cell units with a respective first electrode ensemble,
the plurality of second cell units of the second cell type are each high-power cell units with a respective second electrode ensemble,
each of the respective first electrode ensembles have a higher energy density than each of the respective second electrode ensembles,
each of the respective second electrode ensembles have a higher power density than each of the respective first electrode ensembles, and
at least one of (i) the first plurality of unit cells, (ii) the second plurality of unit cells are connected in series.

9. The motor vehicle according to claim 8, wherein, the first cell units in the plurality of first cell units are interleaved with the second cell units of the plurality of second cell units.

\* \* \* \* \*